(12) United States Patent
Malvache et al.

(10) Patent No.: US 12,072,550 B2
(45) Date of Patent: Aug. 27, 2024

(54) TELESCOPE PROVIDED WITH A DEVICE FOR ADJUSTING THE TILT AND THE POSITION OF A MIRROR

(71) Applicant: UNISTELLAR, Marseilles (FR)

(72) Inventors: Arnaud Malvache, Fuveau (FR); Antonin Borot, Marseilles (FR)

(73) Assignee: UNISTELLAR, Marseilles (FR)

( * ) Notice: Subject to any disclaimer, the term of this patent is extended or adjusted under 35 U.S.C. 154(b) by 370 days.

(21) Appl. No.: 17/763,854

(22) PCT Filed: Sep. 25, 2020

(86) PCT No.: PCT/FR2020/051675
§ 371 (c)(1),
(2) Date: Mar. 25, 2022

(87) PCT Pub. No.: WO2021/058921
PCT Pub. Date: Apr. 1, 2021

(65) Prior Publication Data
US 2022/0326477 A1    Oct. 13, 2022

(30) Foreign Application Priority Data
Sep. 26, 2019 (FR) ........................... 1910648

(51) Int. Cl.
*G02B 7/182* (2021.01)
*G02B 23/06* (2006.01)
(52) U.S. Cl.
CPC ........... *G02B 7/1824* (2013.01); *G02B 23/06* (2013.01)
(58) Field of Classification Search
CPC ............................... G02B 7/1824; G02B 23/06
USPC ......................................................... 359/871
See application file for complete search history.

(56) References Cited

U.S. PATENT DOCUMENTS 6,118,579 A * 9/2000 Endemann ............. G02B 23/06
359/857

FOREIGN PATENT DOCUMENTS

FR        2923302 A1    5/2009
JP        S61160711 A   7/1986

OTHER PUBLICATIONS

International Search Report issued on Dec. 18, 2020 in corresponding International application No. PCT/FR2020/051675; 5 pages.

* cited by examiner

*Primary Examiner* — Wyatt A Stoffa
*Assistant Examiner* — Mitchell T Oestreich
(74) *Attorney, Agent, or Firm* — Maier & Maier, PLLC

(57) ABSTRACT

A telescope that includes a hollow body, an optical system and mirror positioned in the hollow body, a device for adjusting tilt and the position of the mirror including a carriage translatably movable in the hollow body, a mirror support plate rigidly connected to the carriage by a hinge, where the carriage is translated by a screw/nut mechanism operated by an adjustment button mounted capable of rotating in a housing portion, the adjustment button is arranged such that rotation of the button causes the carriage to be translatably moved, the adjustment button is associated with a stop member designed to cooperate with a complementary stop member arranged in the housing portion so as to limit button rotation and carriage movement, and at least one actuator movably mounted in the carriage that on the support plate such that moving the actuator changes the tilt of the plate.

13 Claims, 10 Drawing Sheets

TELESCOPE PROVIDED WITH A DEVICE FOR ADJUSTING THE TILT AND THE POSITION OF A MIRROR

TECHNICAL FIELD

The invention aims for a telescope provided with a device for adjusting the tilt and the position of a mirror.

The invention relates to the technical field of adjustment devices for optical systems of telescopes.

BACKGROUND

A telescope is intended to observe objects in the sky. It allows, among other things, to observe planets, stars, comets, nebulae, galaxies, and in general, celestial objects, near or far. The telescope is used in particular by astronomers, although its use has been democratized in recent years and stargazing has become a passion for many people of different generations. In order to meet the demands of the growing number of consumers, manufacturers have had to diversify these instruments to meet the demands of a wider audience.

Currently known telescopes on the market integrate an optical system formed by an arrangement of mirrors and/or lenses arranged inside a hollow body so as to collect the light rays emitted by the observed object and form an image of said object in a focal plane.

Figure 1:
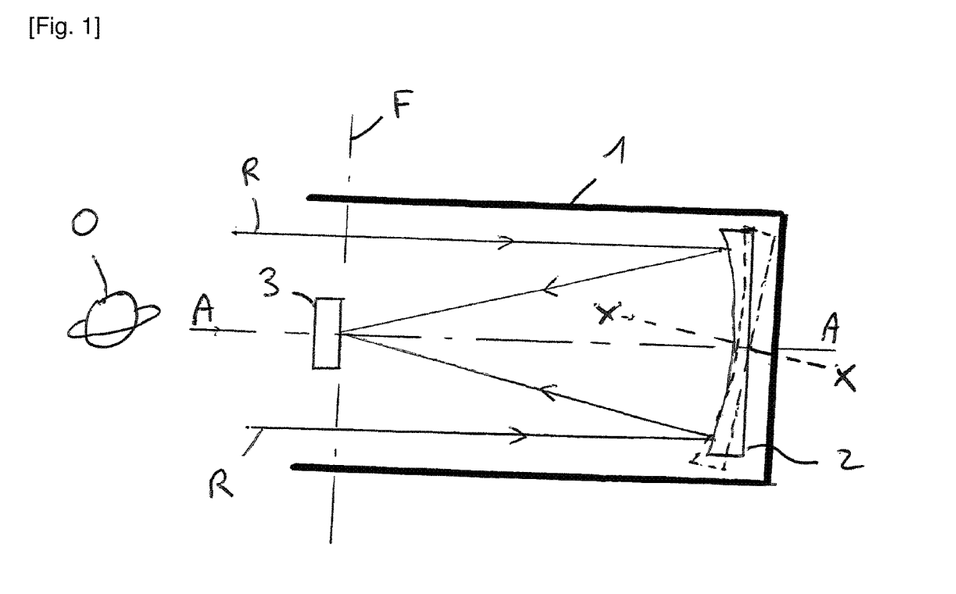
FIG. 1 mentioned above is a diagram illustrating a telescope integrating an optical system.

FIG. 1 schematizes a prior art telescope. It comprises a hollow body 1 inside which penetrate, in use, light rays R coming from an observed object O, for example a planet or a star. Its optical system here is composed of one single concave primary mirror 2, positioned in the hollow body 1. This mirror reflects the light rays R to form, in a focal plane F, an image of the object O. An image sensor 3 allows to acquire the image of the object O.

To obtain a quality image, the sensor 3 must be positioned in the focal plane F and the axis X-X of the mirror 2 must be collinear with the optical axis A-A. The position of the mirror 2 on the optical axis A-A (i.e. the distance between the mirror and the sensor 3) and its tilt may be out of adjustment during handling of the telescope and/or may be incorrectly set due to manufacturing constraints and tolerances. A maladjusted mirror is illustrated by the dotted lines in FIG. 1. It is therefore necessary to adjust the position of the mirror 2, or in other words, to focus, i.e. to adjust the distance between the mirror and the sensor 3. It also appears necessary to adjust the tilt of the mirror 2, or angular adjustment, to reposition the axis of said mirror in the optical axis A-A.

Also, it is common for telescopes to incorporate a device for adjusting the tilt (angular adjustment) and position (focus) of at least the primary mirror. However, the current adjustment devices are complex to make, expensive, and difficult for an amateur user to adjust. Furthermore, they generally require the dismantling of certain parts of the telescope to access the adjustment device, which makes their use even more complex.

The invention aims to overcome this state of affairs. In particular, one aim of the invention is to propose a mirror tilt and position adjustment device that is simple to make and inexpensive while being accurate and easy to adjust for an amateur user.

SUMMARY

The solution proposed by the invention is a telescope comprising:

- a hollow body inside which penetrate, in use, light rays coming from an observed object,
- an optical system positioned in the hollow body to form, in a focal plane, an image of the observed object, which optical system comprises at least one mirror adapted to reflect the light rays penetrating into said body,
- a device for adjusting the tilt and position of the mirror This telescope is remarkable in that the adjustment device comprises:

- a carriage mounted mobile in translation in the hollow body, along the optical axis,
- a support plate wherein the mirror is fixed, which plate is secured to the carriage by means of a hinge allowing a modification of the tilt of said plate,
- the carriage is driven in translation by means of a screw/nut mechanism,
- the screw/nut mechanism can be actuated by means of an adjustment button that can be gripped from the outside of the hollow body, which button engages with the screw or nut of said mechanism,
- the adjustment button is rotatably mounted mobile in a housing part of the hollow body,
- the adjustment button is arranged with the screw/nut mechanism such that rotation of said button causes the carriage to move in translation,
- the adjustment button is associated with a stop member adapted to engage with a complementary stop member provided in the housing part, so as to limit the rotation of the adjustment button and the movement of the carriage,
- at least one actuator which is mounted mobile in the carriage and which acts on the support plate, such that a movement of said actuator causes a modification in the tilt of said plate, which actuator can be actuated from outside the hollow body from the housing part.

The user can very easily make a very precise focus by simply turning the button. By operating in this way, the mobile carriage translates along the optical axis driving the support plate and the mirror. Tilt adjustment can also be done very simply and precisely by actuating the actuator. All these adjustments are made from the outside of the hollow body without having to disassemble any part of the telescope, and are located on the housing part, which greatly simplifies their implementation. The design of this adjustment device is also particularly simple, allowing to limit the costs.

Other advantageous characteristics of the invention are listed below. Each of these characteristics may be considered alone or in combination with the outstanding characteristics defined above. Where applicable, each of these characteristics contributes to the resolution of specific technical problems defined further in the description, to which the outstanding characteristics defined above do not necessarily contribute. Where applicable, these may be the subject of one or more divisional patent applications:

According to an advantageous embodiment, the stop members are arranged to limit the rotation of the adjustment button to one single turn.

According to an advantageous embodiment: the screw and the nut of the screw/nut mechanism are coaxial with the optical axis of the telescope; and the adjustment button is mounted rotatably mobile about an axis that is coaxial with the optical axis of the telescope.

According to an advantageous embodiment, the hinge of the support plate on the carriage is a ball-joint centered on the axis of the mirror.

According to an advantageous embodiment, the center of the mirror is positioned on the optical axis.

According to an advantageous embodiment, two actuators are mounted mobile in the carriage, each actuator being in the form of an adjusting screw of which the distal end acts against the support plate to modify the tilt of said plate.

According to an advantageous embodiment, the distal end of the adjusting screw is spherical in shape and is housed in a seat integral with the support plate, said seat and said distal end being configured so as to form a linear/annular connection.

In an advantageous embodiment, each adjusting screw acts in a separate contact area, which areas form a 90° angle with the center of the ball-joint.

In an advantageous embodiment, one or more spring members act on the support plate, each spring member acting in a contact area, which is separate from the contact areas of the adjusting screws.

In an advantageous embodiment, the adjustment button and/or the housing part are provided with graduations.

BRIEF DESCRIPTION OF THE FIGURES

Other advantages and characteristics of the invention will become clearer upon reading the description of the following preferred embodiment, by reference to the appended drawings, provided for guidance as non-limiting examples, wherein.

DESCRIPTION OF EMBODIMENTS

Such as used here, unless otherwise specified, the use of ordinal adjectives "first", "second", etc., to describe an object simply indicates that different occurrences of similar objects are mentioned and does not imply that the objects thus described must be in any given sequence, whether in time, space, classification, or any other way.

The telescope which is the subject matter of the invention is used for the observation of celestial objects (planets, stars, constellations, nebulae, galaxies, deep sky objects, etc.) but can also be used for the observation of non-celestial objects such as landscapes, characters, animals, etc.

The telescope can be of the type described in FIG. 1, comprising in particular a hollow body 1, an optical system composed of a primary mirror 2, and of an image sensor 3. However, the optical system can be different and comprise for example a primary mirror, a secondary mirror and possibly one or more lenses. The image sensor 3 can be replaced by a conventional eyepiece.

The hollow body 1 preferably has the shape of a hollow tube with a circular cross-section, but could be a tube with an oval, square, octagonal or other cross-section. It is specified that the hollow body 1 is not necessarily tubular in shape, but can be conical, or formed of portions of tubes or of cones, for example. The hollow body 1 can be made of metal, plastic, composite material, etc. For example, its length is between 200 mm and 1,000 mm, its diameter between 50 mm and 500 mm and its thickness between 1 mm and 10 mm.

Figure 2:
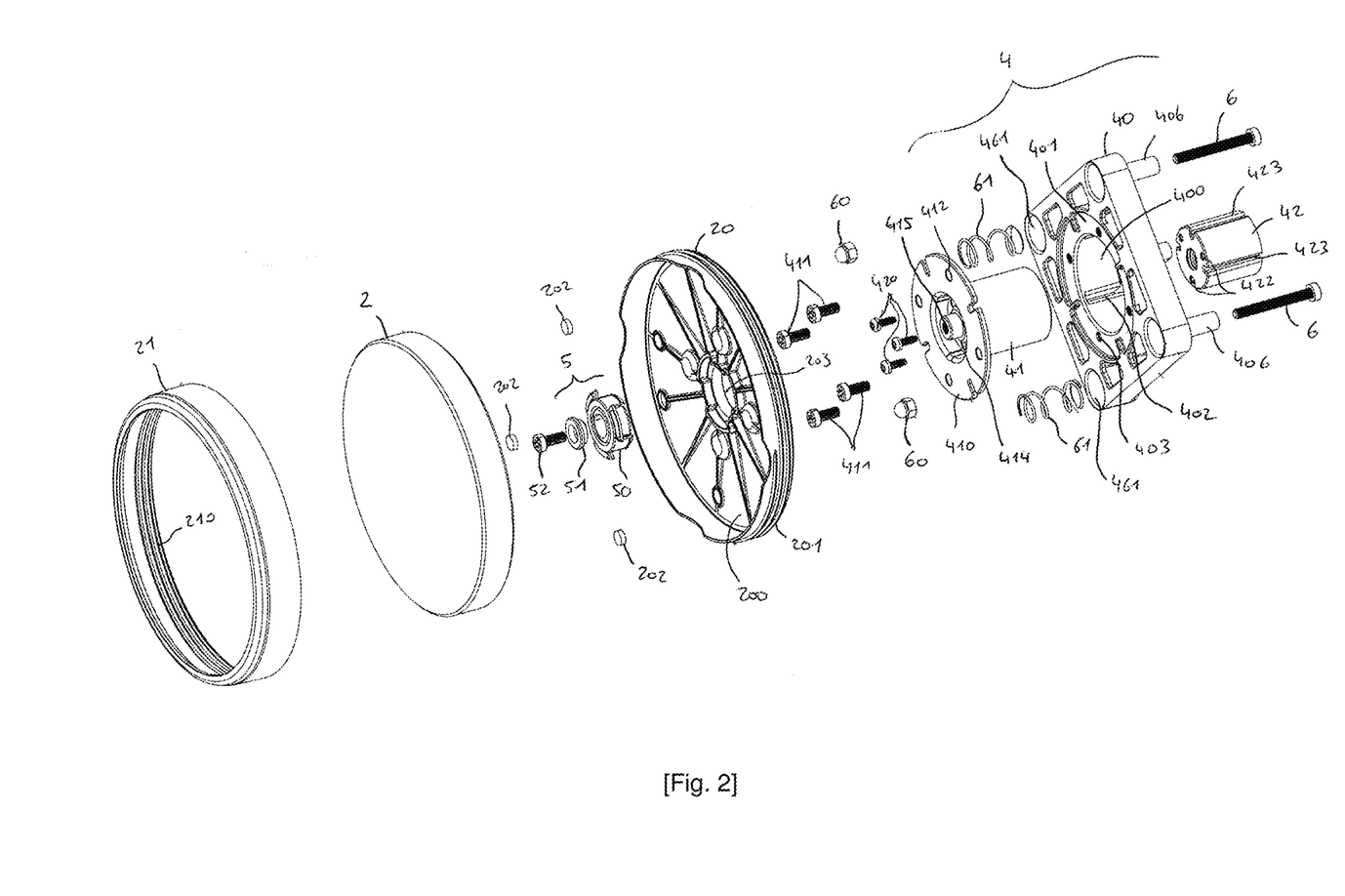
FIG. 2 is an exploded view showing a mirror and different components of the support plate and of the mobile carriage according to the invention.

The mirror 2 is preferably a concave parabolic mirror, of which the diameter corresponds substantially to that of the hollow body 1. In FIG. 2, the mirror 2 has a circular shape adapted to the shape and internal diameter of the hollow body 1. The center of the mirror 2 is positioned on the optical axis A-A (regardless of manufacturing constraints).

The sensor 3 is arranged on the optical axis A-A, in the focal plane F to acquire the image of the observed object O. The sensor 3 is a photosensitive component used to convert the light rays R into electrical signals. The image of the observed object being acquired by the sensor 3, therefore an indirect observation of the object is made, the user not directly observing the image through an eyepiece. The sensor 3 can preferably be a CCD (Charged Coupled Device) or CMOS (Complementary Metal Oxide Semiconductor) sensor with a pixel arrangement (preferably generating color images). This type of sensor 3 has small dimensions, which allows it to be easily installed in the hollow body 1, without interfering with the rays R, while maintaining optimal brightness. The diameter of the sensor 3 is for example between 15 mm and 30 mm.

The electrical signals generated by the sensor 3 can be transmitted to an electronic image processing unit (not shown) by a wired or wireless connection (Bluetooth®, Wifi®, ZigBee®, etc.). The images of the object O are then viewed on a screen, which can be distant from the telescope, for example on the screen of a smartphone.

The device for adjusting the focus and tilt of the mirror 2 will now be described in detail with reference to FIGS. 2 to 9.

The mirror 2 is housed in the support plate 20. The latter has a circular cup shape adjusted to the dimensions of the mirror 2. The front face of the plate 20 has a housing 200 wherein the mirror 2 is installed. The plate 20 is made of injected plastic or metal, for example aluminum. The mirror 2 is held in position in the plate 20 by means of a cover 21 with a central opening leaving the active surface (or reflecting surface) of the mirror 2 free. The latter has a threaded sidewall 210 that screws onto a similarly threaded sidewall 201 of the plate 20. However, the lid 21 can be fixed to the plate 20 in another way, for example by clipping, gluing, welding, etc.

Thus positioned, the mirror 2 is then sandwiched between the front face of the plate 20 and the rear face of the cover 21. The axis of the plate 20 coincides with the axis X-X of the mirror 2. In order to ensure a flexible clamping of the mirror 2 in the plate 20 when the cover is mounted, flexible pads or tabs 202, for example made of rubber or silicone, are advantageously used. These pads or tabs 202 are homogenously installed on the rear face of the mirror 2 and/or in the housing 200 of the plate 20.

The plate 20 is secured to a carriage 4 mounted mobile in translation in the body 1, along the optical axis A-A of the telescope. In FIG. 2, the carriage 4 comprises a plate 40 to which an axis 41 is fixed.

The plate 40 can be made of injected plastic or aluminum, for example. It has a tubular housing 400 that passes right through the plate 40. This housing 400 is preferably cylindrical in shape and sized to receive the axis 41. It is centered on the middle of the plate 40. Its inner wall has one or more longitudinal guide grooves 402, the function of which is described further in the description.

The axis 41 is advantageously in the form of a hollow cylindrical tube provided with a flange 410 at its distal end. This is closed by a bottom wall. The outer diameter of axis 41 is less than the inner diameter of the housing 400 so as to leave an annular space 413 (which can be seen in FIG. 4) about said axis. The proximal end of the axis 41 is open such that a nut 42 can be inserted.

An arrangement 401 is made on the front face of the plate 40, around the tubular housing 400. This arrangement 401 is shaped to receive the flange 410 of the axis 41. The flange 410 is fixed in the arrangement 401 (and therefore the axis 41 on the plate 40) by means of screws 411. These screws 411 pass through through holes 412 made in the flange 410 and screw into tapped holes 403 made in the arrangement 401.

Figure 4:
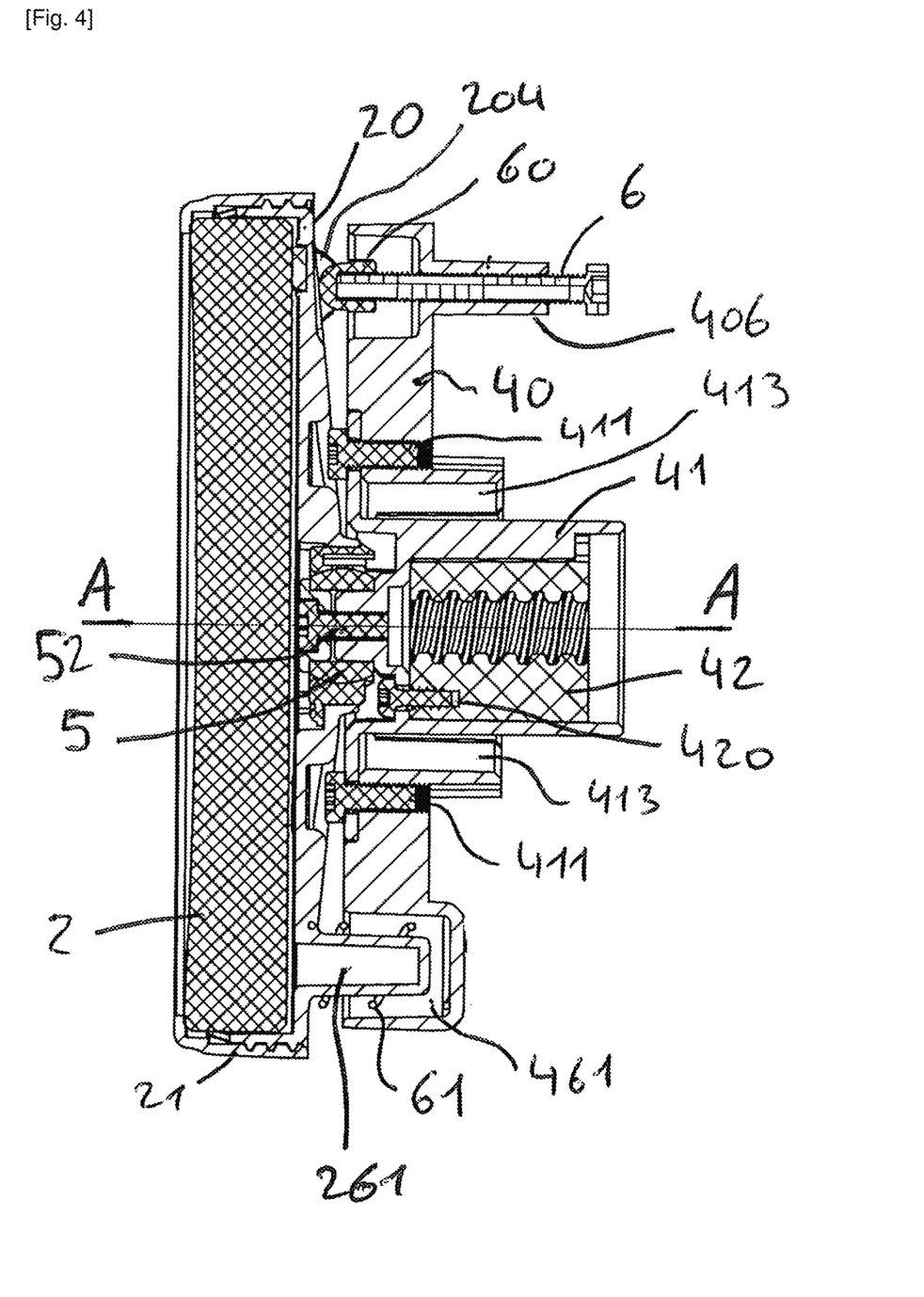
FIG. 4 is a cross-sectional view of the assembly of the mirror, support plate and mobile carriage of FIG. 2.

The length of the axis 41 is greater than that of the housing 400. In this configuration, and as illustrated in FIG. 4, the proximal end of the axis 41 exceeds the rear face of the plate 40.

The nut 42 is housed inside the axis 41. It is held in position in the axis 41 by means of screws 420. The latter pass through through holes 414 made in a bottom wall of the axis 41 and screw into tapped holes 422 made on the nut 42. The outer wall of the nut 42 is advantageously provided with longitudinal grooves 423 engaging with complementary ribs (not shown) made on the inner wall of the axis 41. These grooves and ribs form a locator allowing the tapped holes 422 to be positioned very simply opposite the holes 414.

The nut 42 is preferably made of Teflon or POM (for Poly-Oxy-Methylene) so as to limit friction with the adjusting screw described earlier in the description.

The plate 20 is secured to the carriage 4 by means of a hinge allowing the tilt of said plate to be modified. This hinge is preferably a ball-joint centered on the axis of the plate 20 and, therefore, on the center of the mirror 2 and on the optical axis A-A. The plate 20 thus has three degrees of freedom in rotation. This swivel movement of the plate 20 allows it to be tilted in all directions. The use of a ball-joint 5 centered on the axis of the mirror 2 (and on the optical axis) offers, the main advantage of being able to adjust the angle of the plate 2 (and therefore the angle of the mirror), without modifying its focal length, or at least, by minimizing the tampering of this focal length.

In FIG. 2, this ball-joint 5 is formed by a ring 50 wherein a ball or nut 51 is housed. The ring 50 forms the spherical bearing surface of the ball-joint and can incorporate bearings to limit friction with the ball or nut 51. It is fixed in a housing 205 arranged in the center of the plate 20. This fixing is made by clipping, screwing, gluing, welding, etc. The ball or nut 51 constitutes the male spherical bearing surface of the ball-joint. A screw 52 allows to hold the ball or nut 51 in position in the ring 50. This screw 52 passes through the ball or nut 51, the ring 50 and the plate 20 to screw into a threaded hole 415 made in the bottom wall of the axis 41, in the center of the flange 410.

At least one actuator is mounted mobile in the carriage 4. This actuator acts on the plate 20, such that a movement of said actuator causes a modification in the tilt of said plate. In FIG. 2, two actuators are shown. They are each presented in the form of an adjusting screw 6, the distal end of which acts against the plate 20 to modify its tilt.

Each adjusting screw 6 is mounted in engagement in a threaded shaft 406 made in the plate 40. The shaft 406 is long enough such that the screw 6 does not rotate in it. For example, the length of the shaft is greater than or equal to half the length of the screw 6. The screw 6 is inserted from the rear face of the plate 40 and comes out at its front face.

Figure 10:
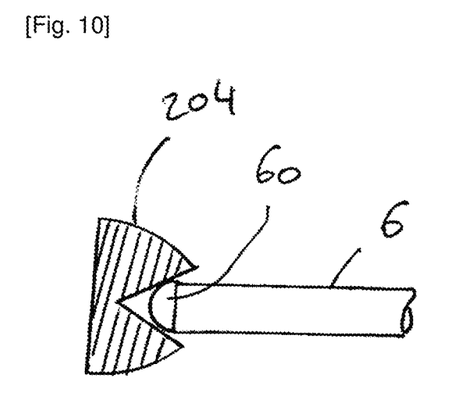
FIG. 10 shows a seat wherein the distal end of a screw for adjusting the mirror tilt is housed.

Referring to FIGS. 4 and 10, the distal end 60 of the adjusting screw 6 is spherical in shape, and more specifically, hemispherical. This distal end 60 is housed in a seat 204 integral with the plate 20. The seat 204 and distal end 60 are configured to form a linear/annular (or sphere/cylinder) connection. The seat can be conical or trough-shaped, for example with a V-shaped cross-section. This shape allows for relative ball and socket movement between the seat 204 and the distal end 60, as well as some sliding of said distal end within said seat. This type of connection has the advantage of limiting the stresses on the screw 6 and/or on the plate 20, when said screw acts on said plate. To simplify the design and reduce manufacturing costs, the distal end is advantageously formed by a round-headed nut 60 (FIG. 2) screwed to the end of the screw 6.

As the adjusting screw 6 is rotated back and forth in the shaft 406, the distal end 60 of the screw 6 more or less protrudes from the front face of the plate 40 and pushes the plate 20. This thrust force will cause the plate 20 to pivot around the ball-joint 5 such that its tilt angle will change. The adjusting screw 6 is rotated manually, by means of a suitable tool (for example, a screwdriver or an allen key) which engages in a recess made in the head of said screw.

Figure 3:
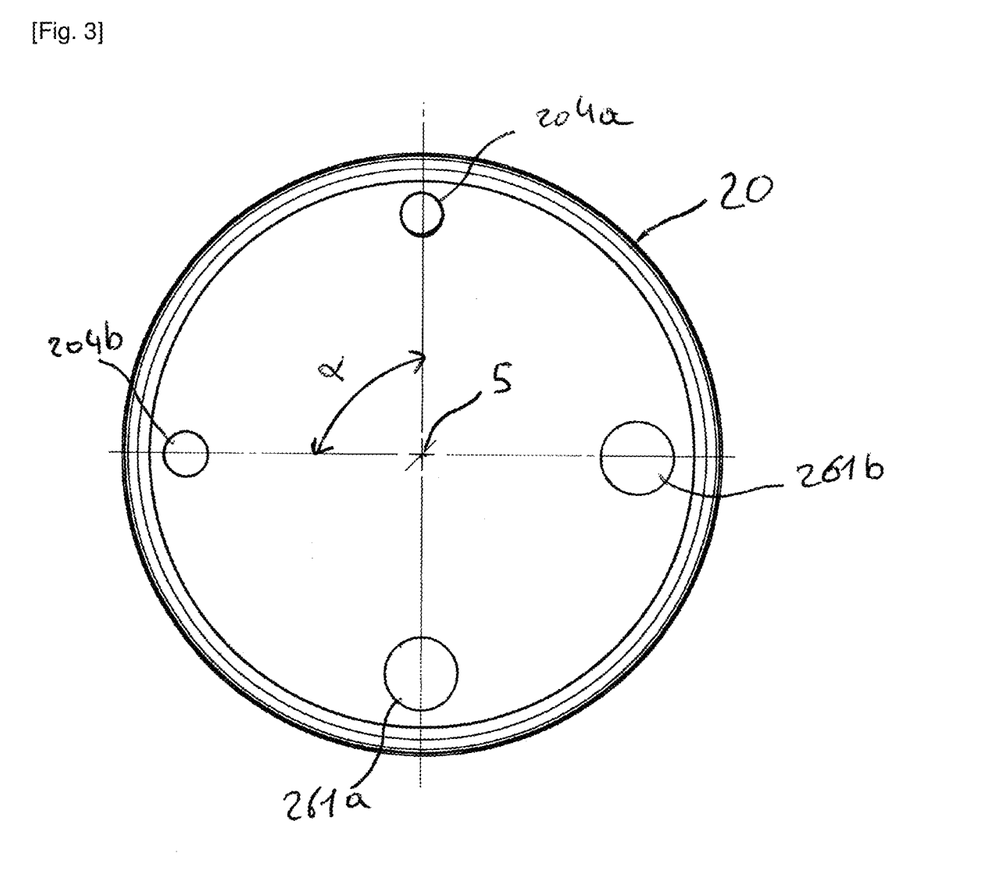
FIG. 3 is a view of the rear face of a support plate according to the invention.

Referring to FIG. 3, each adjusting screw 6 acts in a separate contact area 204a, 204b, these areas being materialized by the seats 204. These contact areas 204a, 204b form an angle α of 90° with the center of the ball-joint 5. In FIG. 3, one contact area 204a is located vertically from the center of the ball-joint 5 and another contact area 204b is located horizontally from said center. By acting only on the contact area 204a, the plate 20 pivots up and down (about the pitch axis for an aeronautical analogy). By acting only on the contact area 204b, the plate 20 pivots right and left (about the yaw axis for an aeronautical analogy). And by simultaneously acting on both areas 204a, 204b, the tilt of the plate 20 can be adjusted in all directions. A position of the contact areas 204a, 204b at 90° allows for a precise adjustment of the tilt angle of the plate 20, with a limited articulation of the adjusting screws 6.

The plate 20, supporting the mirror 2, is likely to tilt under its own weight, which would cause an untimely tampering of its tilt. To overcome this, it is possible to provide a ball-joint connection between the distal end 60 of the adjusting screw 6 and the seat 204. This solution can be considered, however it generates mechanical stresses, even minimal, on the adjusting screw 6 and/or on the plate 20, when said screw acts on said plate. Furthermore, since a ball-joint connection is not perfect due to manufacturing tolerances, a certain clearance may exist between the distal end 60 and the seat 204, which clearance limits the precision of the adjustment of the tilt angle of the mirror 2.

To resolve this problem, elastic members 61 act on the plate 20. In FIGS. 2 and 4, these elastic members 61 are presented in the form of standard helical springs, allowing to reduce manufacturing costs. These elastic members 61 act on the plate 20 so as to generate a thrust force that opposes that exerted by the adjusting screws 6. The plate 20 and the mirror 2 are thus fully held in position, whatever the tilt angle, the possibly functional clearances are taken up. A precise adjustment of the tilt angle of the mirror 2 is this ensured.

Referring to FIG. 3, each elastic member 61 acts in a contact area 261a, 261b. To optimize the effects mentioned in the previous paragraph, these contact areas 261a, 261b are separate from the contact areas 204a, 204b of the adjusting screws 6. In FIG. 3, the contact areas 261a, 261b are arranged symmetrically to the areas 204a, 204b, relative to the center of the ball-joint 5. These contact areas 261a, 261b form an angle α of 90° with the center of the ball-joint 5. A contact area 261a is located vertically from the center of the ball-joint 5 and another contact area 261b is located horizontally from said center. The spring 61, which acts on the contact area 261a, generates a thrust force that opposes that exerted by the adjusting screw 6 acting on the contact area 204a. The spring 61, which acts on the contact area 261b, generates a thrust force that opposes that exerted by the adjusting screw 6 acting on the contact area 204b. Each adjusting screw 6 is thus associated with a spring 61, which not only improves the holding in position of the plate 20 and of the mirror 2, but also the taking up of possibly functional clearances.

Referring to FIGS. 2 and 4, the springs 61 are mounted freely in housings 461 arranged in the plate 40 and of which the opening is located on the front face of said plate. One end of the spring 61 acts against a bottom wall of the housing 641. This housing ensures that this end of the spring 61 is held in position. The other end of the spring 61 acts freely against the rear face of the plate 20, at the contact area 261a or 261b. To avoid twisting of the spring 61 and to ensure that it acts correctly in the contact area, a guide 261 is advantageously provided on which the spring 61 is mounted. This guide 261 is in the form of a tubular portion protruding from the rear face of the plate 20. The dimensions and shapes of the guides 261 and of the housings 461 are such that said guides can fit into said housings. A very compact assembly of the plate and of the carriage 4 is thus obtained, as illustrated by FIG. 4.

The carriage 4 is driven in translation by means of a screw/nut mechanism that can be actuated by means of an adjustment button. The nut for this mechanism is the nut 42 described above. The adjusting screw of the screw/nut mechanism, the adjustment button and the housing part with which they are associated will now be described with reference to FIGS. 5 to 7.

Figure 5:
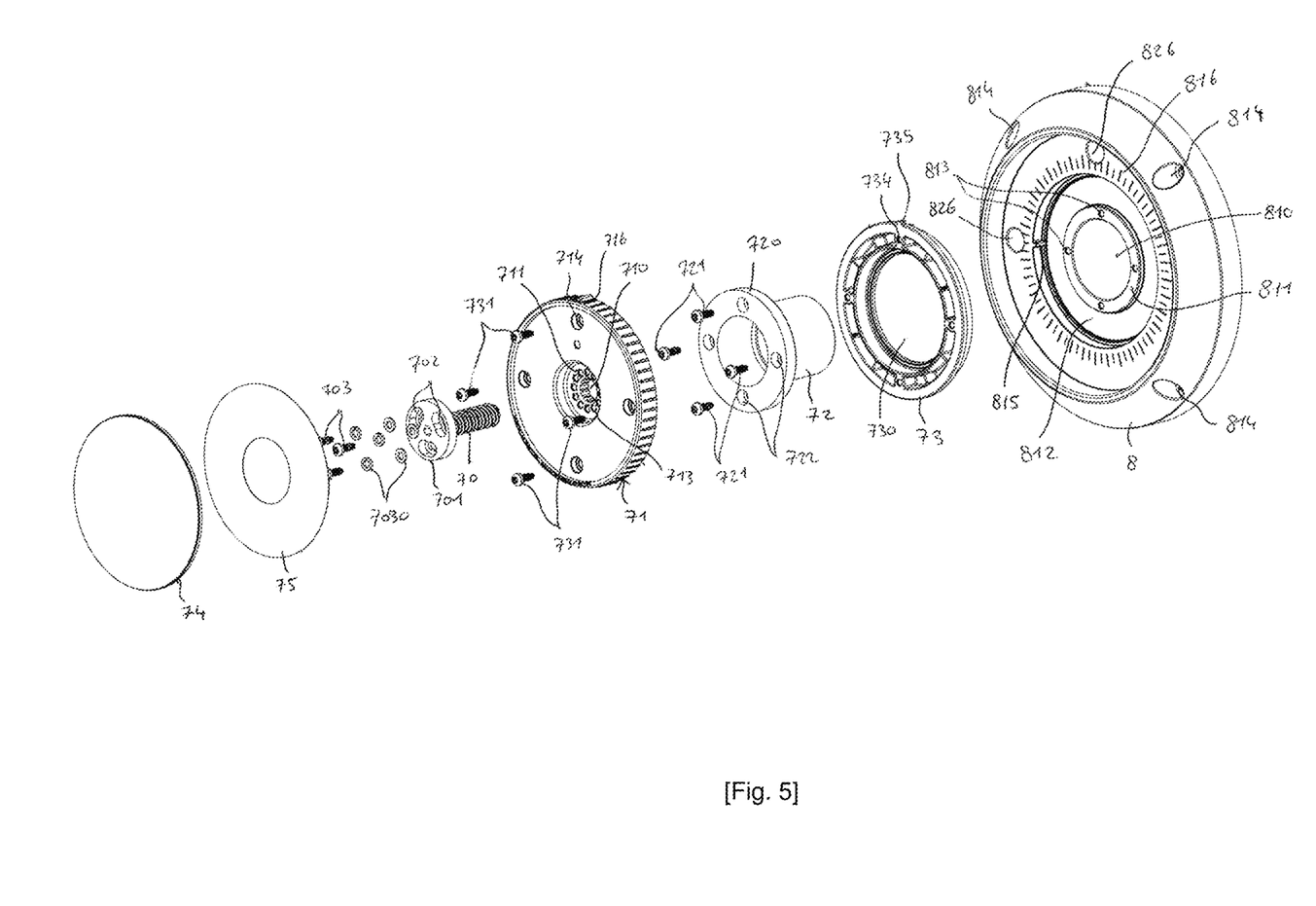
FIG. 5 is an exploded view showing different components of a button and a housing part according to the invention.

The adjusting screw 70 of the screw/nut mechanism engages with the nut 42 mounted in the carriage 4. The screw 70 and the nut 42 are sized such that the stroke of the carriage 4 is limited, for example less than or equal to 5 cm. The screw head 70 has a flange 701 comprising holes 702 for screw passage.

The adjustment button 71 is presented in the form of a circular part in FIG. 5, but another shape can be considered (square, oval, rectangular, etc.). For example, its diameter is between 2 cm and 15 cm and its thickness between 0.5 cm and 2 cm. It can be made of injected plastic or metal, for example aluminum.

The button 71 has a circular opening 710 passing through said button. This opening is coaxial to the axis of the button 71. It is sized to allow the passage of the screw 70. An arrangement 711 is made on the front face of the button 71, around the opening 710. This arrangement 711 is shaped to receive the flange 701 of the screw 70. The flange 701 is fixed in the arrangement 711 (and therefore the screw 70 on the button 71) by means of screws 703, possibly associated with lock washers 7,030. These screws 703 pass through through holes 702 made in the flange 713 and screw into tapped holes 711 made in the arrangement 401.

To improve the appearance and prevent unauthorized access to the screws 703, a cover 74 may cover the front face of the button 71. This cover 74 can, in particular, be glued by an adhesive strip 75.

A bearing 72, advantageously made of steel to limit friction. This bearing 72 is advantageously in the form of a hollow cylindrical tube provided with a flange 720 at its proximal end. The two ends of the bearing 72 are open to allow the adjusting screw 70 to pass through. The outer diameter of the bearing 72 is less than the inner diameter of the annular space 413 which can be seen in FIG. 4. The inner diameter of the bearing 72 is adjusted to the outer diameter of the axis 41. During the translation of the carriage 4, the axis 41 slides in the bearing 70, which acts as a guide.

Figure 9:
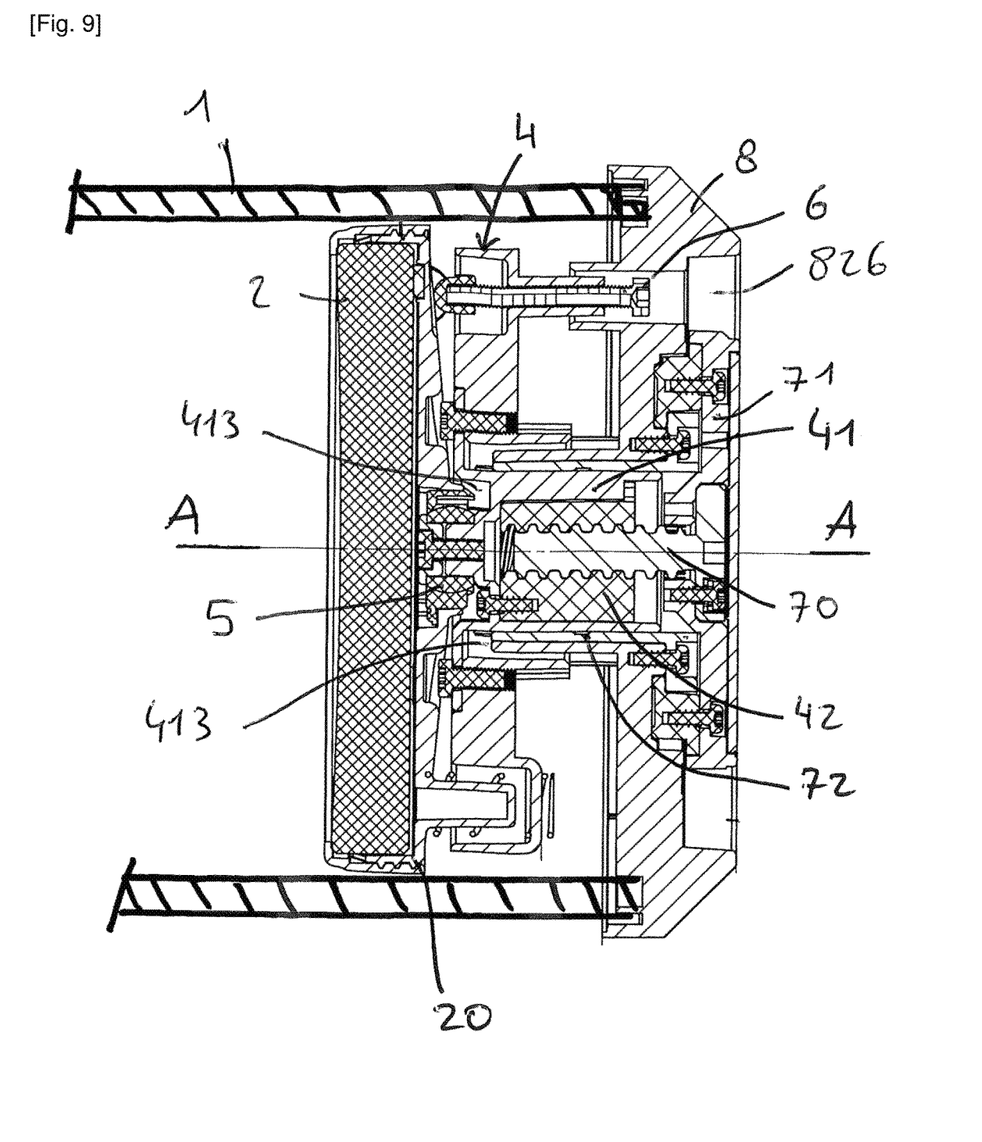
FIG. 9 is a transverse cross-sectional view of an adjustment device according to the invention mounted in the hollow body of a telescope.

The bearing 72 is fixed to a housing part 8 of the hollow body 1. In particular, the housing part 8 can be fixed to one end of the tube forming the body 1 (FIG. 9). This fixing can be made for example by gluing, screwing, welding, or, preferably by means of screws housed in holes 814 made on said part. This solution has the advantage of being able to easily disassemble the housing part 8 and to easily separate it from the body 1.

In FIG. 5, the housing part 8 is presented in the form of a circular part, but another shape can be considered (square, oval, rectangular, etc.). For example, its diameter is between 5 cm and 50 cm and its thickness is between 1 mm and 10 mm and its thickness is between 0.5 cm and 5 cm. It can be made of injected plastic or metal, for example aluminum.

Figure 8:
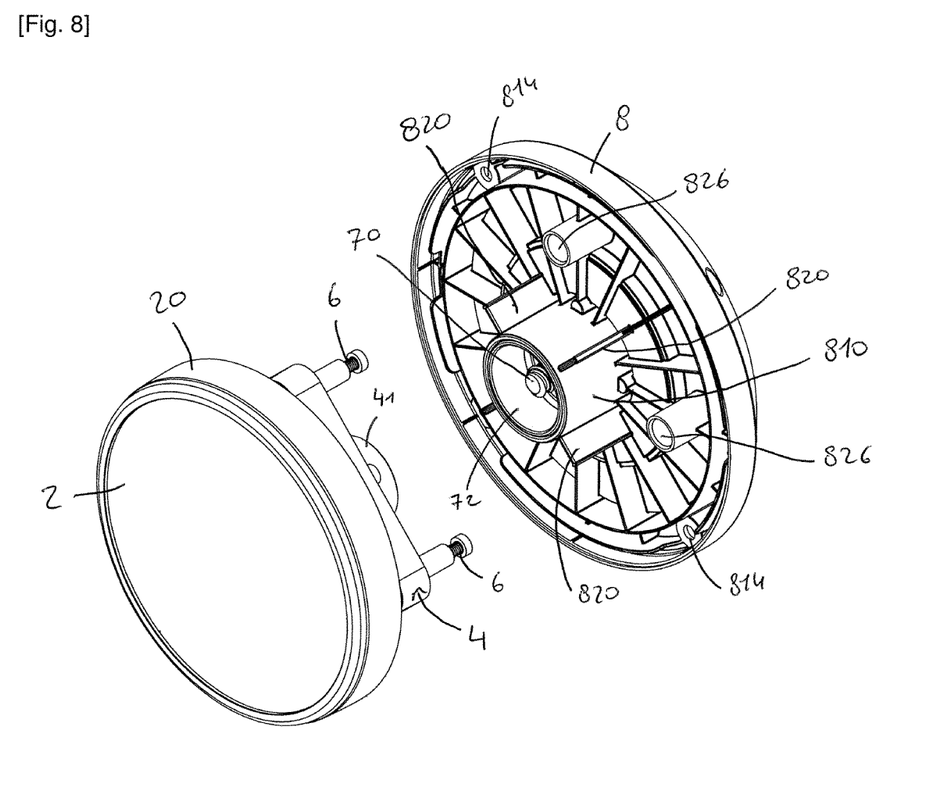
FIG. 8 is an exploded view showing on the one hand, the assembly of the mirror, the support plate and the mobile carriage of FIG. 2 and on the other hand, the assembly of the button and of the housing part of FIG. 5.

The housing part 8 has a tubular housing 810 passing through said part and protruding from the rear face of said part (FIG. 8). This housing is coaxial to the axis of the housing part 8, i.e. centered on the middle of said part. It is configured to house the bearing 72. An arrangement 811 is made on the front face of the housing part 8, around the tubular housing 810. This arrangement 811 is shaped to receive the flange 720 of the bearing 72. The flange 720 is fixed in the arrangement 811 (and therefore the bearing 72 on the housing part 8) is done by means of screws 721. These screws 720 pass through holes 722 made in the flange 720 and screw into tapped holes 813 made in the arrangement 811.

The adjustment button 71 is rotatably mounted mobile in the housing part 8, around an axis which is coaxial to the optical axis A-A of the telescope. In FIG. 5, the button 71, provided with the screw 70, is adapted to be housed in a housing 812 arranged on the front face of the housing part 8. This housing 812 is coaxial to the axis of the housing part 8, i.e. centered on the middle of said part. This housing 812 is circular, its depth and diameter corresponding substantially to those of the button 71 such that said button can rotate freely about its axis when installed in said housing. As the button 71 is installed on the front face of the housing part 8, it is freely accessible from outside the hollow body 1.

According to one embodiment, the button 71 is held in position on the housing part 8, and more particularly in the housing 812, while retaining its freedom of rotation. This holding in position is achieved by means of a locking part 73. In FIG. 5, the locking part 73 is presented in the form of a circular part, but another shape can be considered (square, oval, rectangular, etc.). Its diameter corresponds substantially to that of the button 71. It can be made of injected plastic or metal, for example aluminum.

The locking part 73 has a circular opening 730 passing through said part. This opening is coaxial to the axis of the part 73. It is sized to allow the passage of the bearing 72. However, the diameter of the opening 730 is less than the diameter of the flange 720 such that the latter acts as a stop.

The mounting of the button 71 on the bearing 72 is preferably done in the following way:

The locking part 73 is inserted onto the bearing 72 from the distal end of said bearing. Insertion is performed until the edge of the opening 730 abuts the rear face of the flange 720.

The button 71 is then positioned opposite the flange 720.

Finally, the button 71 is secured to the locking part 73 by means of screws 731. These screws 731 pass through holes 714 made in the button 71 and screw into tapped holes 734 made on the locking part 73.

Figure 7:
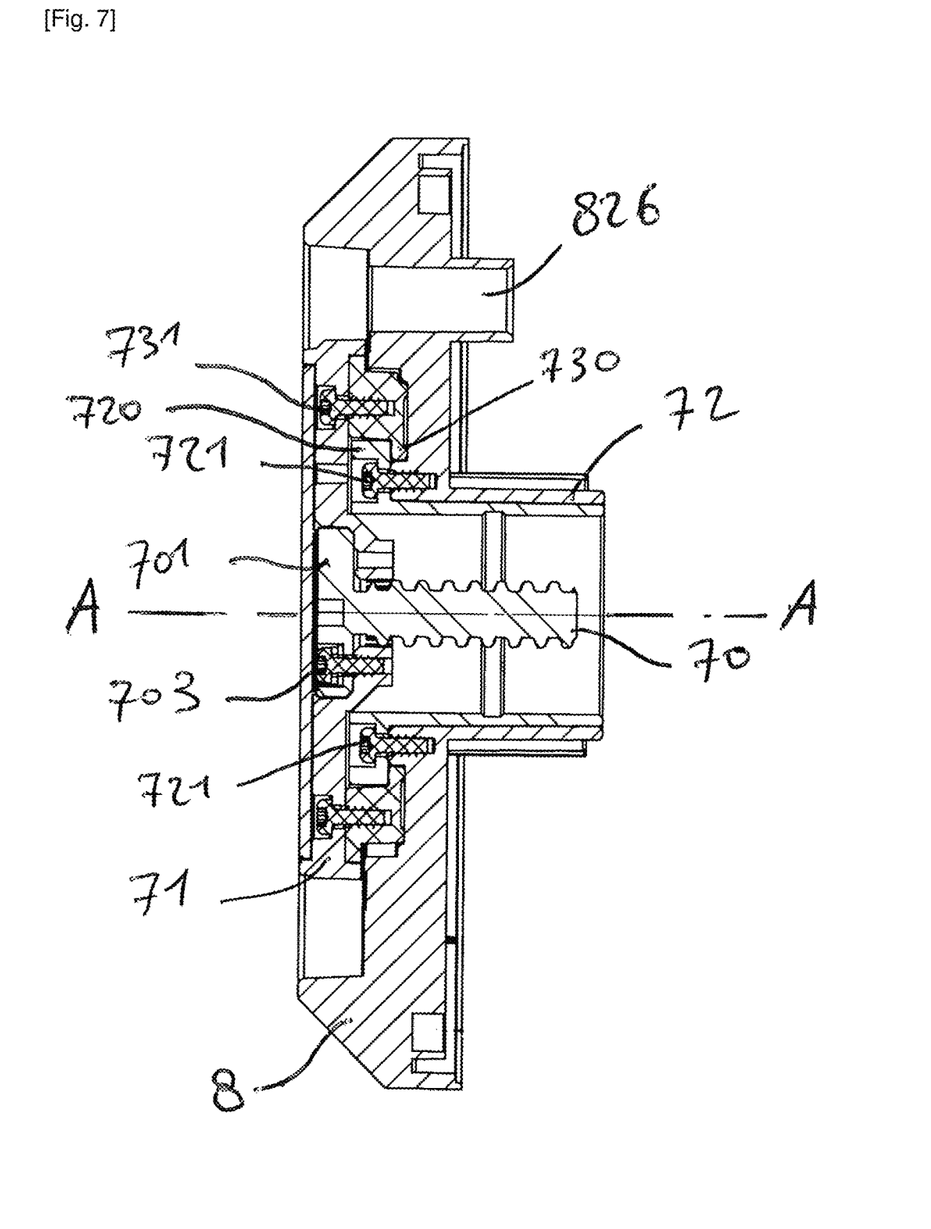
FIG. 7 is a transverse cross-sectional view of the assembly of the button and of the housing part of FIG. 5.

In this configuration, and as shown in FIG. 7, the flange 720 is sandwiched between the button 71 and the locking part 73. The assembly formed by the button 71 and the locking part 73 is free to pivot about the axis X-X of said button—or of the bearing 72—but is locked in translation on said bearing by the engagement of the opening 730 with the flange 720. When the bearing 72 is fixed to the housing part 8, the button 71 can rotate about its axis X-X but cannot move out of the housing 812 of said part.

When the button 71 and bearing 72 are installed on the housing part 8, this assembly is assembled to the assembly formed by the mirror 2, the plate 20 and the carriage 40. Referring to FIGS. 8 and 9, this assembly is achieved by aiming the adjusting screw 72 into the nut 42. The screw 72 is engaged in the nut 42 over a distance long enough to allow translation of the carriage 4 along the optical axis A-A over a distance of about 2 cm forward and 2 cm backward. It may be advantageous to not have to handle the button 71 to engage the screw 72 in the nut 42. Also, the securing of the button 71 to the flange 701 of the screw 70 can be performed only after installing the screw 72 in the nut 42.

During assembly, the bearing 72 overlaps the axis 41 and is housed in the annular space 413. Referring to FIG. 8, the housing part 8 has longitudinal ribs or fins 820 on its rear face. These ribs or fins 820 are formed on the outer wall of the housing 810 protruding from the rear face of the housing part 8. These ribs or fins 820 are adapted to engage in the guide grooves 402 arranged on the inner wall of the housing 400 of the plate 40. The engagement of the grooves 402 and of the ribs or fins 820 mainly allows a rotational locking of the carriage 4 relative to the housing part 8, and subsidiarily an additional translational guidance of said carriage.

In this assembly configuration, when a user turns the button 71, the adjusting screw 70 is rotated. The rotational movement of the screw 70 leads to a translational movement of the nut 42 and thus to a translation of the carriage 4 along the optical axis. In the appended Figures, the screw 70 and nut 42 are coaxial with the optical axis A-A. This advantageous embodiment allows for a button 71 that is centered on the housing part 8 and on the optical axis A-A. The compactness of the adjustment device can thus be optimized. This arrangement of the screw 70 and of the nut 42 further allows to limit the forces to move the carriage 4, the plate 20 and the mirror 4. The user does not need to force the button 71 to turn.

In FIGS. 8 and 9, the housing part 8 has holes 826 passing through said part. When the carriage 40 is assembled on the housing part 8 (i.e. when the adjusting screw 72 is engaged in the nut 42), the screws 6 for adjusting the tilt of the plate 20 are housed in these holes 826. The user thus has access to the heads of the screws 6 from outside the body 1, and more specifically, from the front face of the housing part 8. All they need to do, is insert a suitable tool into the holes 826 to actuate the screws 6.

When the user focuses, they turn the button 71 to move the carriage 4 along the optical axis, until the mirror 2 reaches the desired position. However, it is not desirable that the user can unreasonably tamper with the position of the mirror 2 on the optical axis. Indeed, if the user turns the button 71 ten times, the focal length of the optical system will be highly tampered with. And an amateur user will find it very difficult to find a consistent position of mirror 2 to obtain a quality image. It therefore seems desirable to limit the rotation of the button 71 and the movement of the carriage 4.

Figure 6:
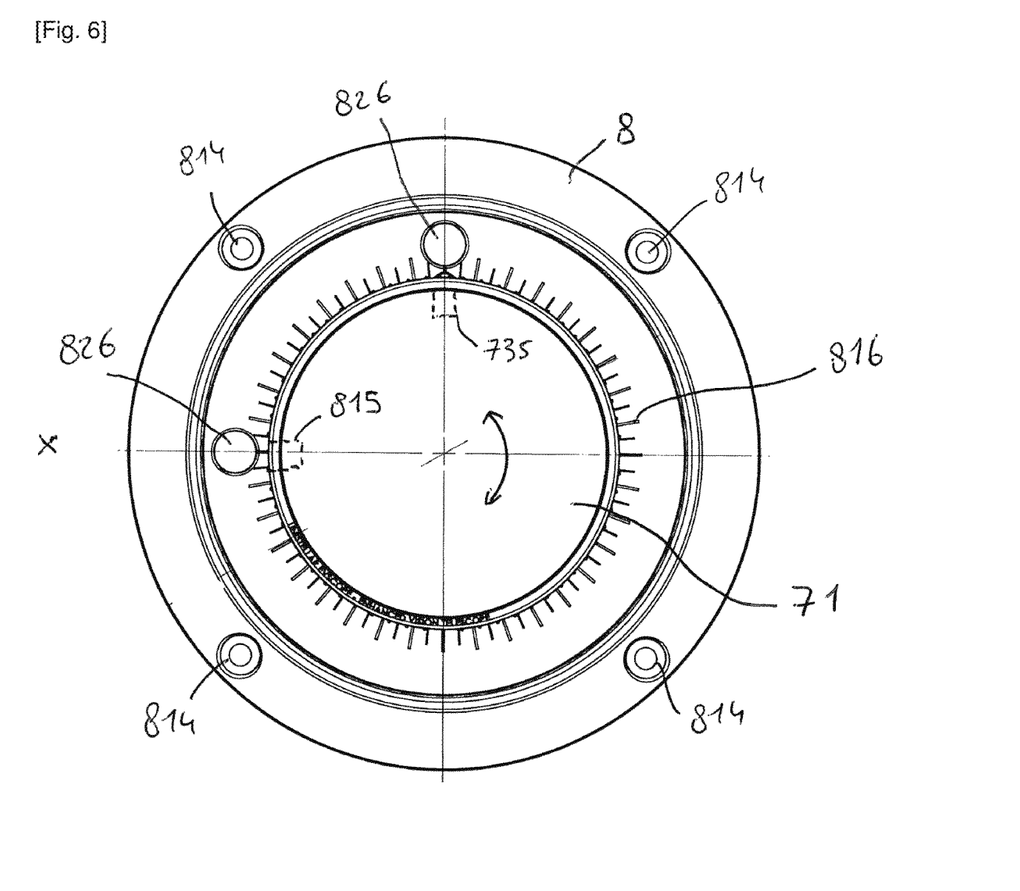
FIG. 6 is a front view of the button mounted in the housing part of FIG. 5.

To do this, and as illustrated in FIGS. 5 and 6, a stop member 815 is arranged in the housing part 8. In FIGS. 5 and 6, this stop member 815 is arranged in the housing 812 of the housing part 8, on the side wall of said housing. The stop member 815 projects radially from this sidewall. A complementary stop member 735 is arranged on the outer edge of the locking part 73. The stop member 815 projects radially from this sidewall. When the button 71 (integral with the locking part 73) is mounted on the housing part 8, and the two stop members 735 and 815 come into contact with each other, the rotation of said button is locked. In the example shown in FIG. 9, the button 71 is initially positioned such that the stop member 735 is vertical. The complementary stop member 815 of the housing part 8 is positioned horizontally. In this configuration, the button 71 can be rotated 90° counterclockwise until the two stop members 735 and 815 come into contact and lock the rotation. The button 71 can be rotated 270° counterclockwise until the two stop members 735 and 815 come into contact and lock the rotation. Finally, the stop members 735, 815 are arranged to limit the rotation of the button 71 to one single turn (360°, disregarding the thicknesses of said members).

By limiting the rotation of the button 71, the articulation of the carriage 4 is limited. It seems advantageous in terms of use and handling by an amateur, to limit the translation of the carriage 4 to a distance of between 1 mm and 2 cm (0.5 mm to 1 cm forwards and 0.5 cm to 1 cm backwards). In practice, the authorized articulation corresponds to the pitch of the adjusting screw 70 (for example, if its pitch is 4 mm, the articulation of the carriage 4 is 4 mm). The user can thus focus very quickly, without the risk of adjusting the focal length of the optical system too much. However, the limited articulation of the carriage 4 allows the user to focus on objects closer than a celestial object, for example a landscape, a monument, etc.

In any case, to allow fine adjustment of the position of the mirror 2, the button 71 and/or the housing part 8 are preferably provided with graduations 716, 816. These graduations can be seen by the user.

An adjustment of the tilt and of the position of the mirror 2 is advantageously performed in the factory to obtain the best possible image quality. Such an adjustment can be done by means of a Bahtinov mask and/or from a laser source. For an amateur user, the adjustment can be done in several known ways. For example, the focus is made according to the sharpness of the image. And adjustment of the mirror tilt can be done by aiming at a star and minimizing the size of its image: if the adjustment is correct, the image of the star is a point; if the adjustment is wrong, the image of the star is bigger.

The factory adjustment can consist of presetting the position of the carriage 4 with the adjusting screw 70. The operator has access to the entire stroke of the screw-nut mechanism such that they can easily overcome the variations in the dimensions of the various parts, and make an optimal adjustment where the distance between the mirror 2 and the sensor 3 is equal to the focal length of the optical system. Once this adjustment is done, the operator fixes the button 71 to the adjusting screw 70. The button 71 is positioned on a "zero" scale (materialized by a lug 717 of the button 71 positioned vertically). The operator can then prevent access to the factory adjustment by placing down the cover 74. It must be noted that the user can easily find this factory adjustment by repositioning the button 71 on the "zero" graduation.

As illustrated in FIG. 9, when all the elements are assembled, a very compact and easy to handle adjustment device is obtained. It can be inserted in one piece into the hollow body 11, in a very quick and simple way. Likewise, in the event of damage to one of the elements, it can be easily removed from the body 1 and replaced by another directly operational adjustment device.

The arrangement of the different elements and/or means and/or steps of the invention, in the embodiments described above, must not be understood as requiring such an arrangement in all the implementations. Other variants can be provided, and in particular:

- The hinge ensuring the connection of the plate 20 to the carriage 4 can consist of a simple pivot connection, although this solution offers less possibility of adjusting the tilt of the plate.
- The actuators can be presented in the form of a piston. They can possibly be motorized, although this complicates the design and increases manufacturing costs.
- One single actuator (in particular one single adjusting screw 6) can be used to modify the tilt of the plate 20, in particular in the case where the possibilities of adjusting the tilt of the mirror 2 can be reduced.
- The cross-section of the different parts (in particular support plate, housing part, button, bearing, etc.) is generally circular, but other shapes can be provided, in particular to adapt to the cross-section of the body 1.
- The position of the contact areas 204a, 204b and/or 261a, 261b is not necessarily 90°. They may, for example, form an angle α of between 10° and 170° with the center of the ball-joint 5. Likewise, the contact areas 204a, 204b and/or 261a, 261b are not necessarily positioned vertically and horizontally from the center of the ball-joint 5.
- The elastic members 61 can be in the form of elastomer pads, spring blades, etc.
- One or more than two elastic members 61 may be provided.
- In the screw/nut mechanism, it can be considered to reverse the design, i.e. a nut in engagement with the adjustment button 71 and a screw integral with the carriage 4, the nut thus acting as the driving member.
- The position and number of stop members 735, 815 may vary. Furthermore, these members may be arranged and/or configured to limit the rotation of the button 71 to less than one turn (less than 360°, for example 180°) or more than one turn (more than 360°).
- The screw 70 and nut 42 of the screw/nut mechanism are not necessarily coaxial with the optical axis A-A.
- The stop member 735 associated with the adjustment button 71 may be directly arranged on a wall of said button.
- The button 71 is advantageously in direct engagement with the adjusting screw 70 as illustrated in the appended Figures. However, an indirect connection can be considered, for example by interposing a reducer between the button 71 and the indirect adjusting screw 70.
- The adjustment device is suitable for optical systems of other devices for capturing images of observed objects, such as cameras, laboratory devices, etc.

Furthermore, one or more characteristics outlined only in one embodiment can be combined with one or more other characteristics outlined only in another embodiment. Likewise, one or more characteristics outlined only in one embodiment can be generalized to the other embodiments, even if this or these characteristic(s) is/are described only in combination with other characteristics.

The invention claimed is:

1. A telescope comprising:
    a hollow body inside which penetrate light rays coming from an observed object,
    an optical system positioned in the hollow body to form, in a focal plane, an image of the observed object, the optical system comprising at least one mirror adapted to reflect the light rays penetrating into said body,
    a device for adjusting the tilt and position of the mirror, wherein the adjustment device comprises:
    a carriage mounted mobile in translation in the hollow body, along the optical axis,
    a support plate wherein the mirror is fixed, which plate is secured to the carriage by a hinge allowing a modification of the tilt of said plate,
    the carriage is driven in translation by a screw/nut mechanism,
        the screw/nut mechanism is actuated by means of an adjustment button that is gripped from the outside of the hollow body, which button engages with the screw or nut of said mechanism,
        the adjustment button is rotatably mounted mobile in a housing part of the hollow body,
        the adjustment button is arranged with the screw/nut mechanism such that rotation of said button causes the carriage to move in translation,
        the adjustment button is associated with a stop member adapted to engage with a complementary stop member provided in the housing part, so as to limit the rotation of said button and the movement of the carriage,
    at least one actuator is mounted mobile in the carriage and which acts on the support plate, such that a movement of said actuator causes a modification in the tilt of said plate, which actuator can be actuated from outside the hollow body from the housing part.

2. The telescope according to claim 1, wherein the stop members are arranged to limit the rotation of the adjustment button to one single turn.

3. The telescope according to claim 1, wherein:
    the screw and the nut of the screw/nut mechanism are coaxial to the optical axis of the telescope,
    the adjustment button is rotatably mounted mobile about an axis which is coaxial to the optical axis of the telescope.

4. The telescope according to claim 1, wherein the hinge of the support plate on the carriage is a ball-joint centered on the axis of the mirror.

5. The telescope according to claim 3, wherein the center of the mirror is positioned on the optical axis.

6. The telescope according to claim 1, wherein:
two actuators are mounted mobile in the carriage,
each actuator is presented in the form of an adjusting screw, the distal end of which acts against the support plate to modify the tilt of said plate.

7. The telescope according to claim 6, wherein the distal end of the adjusting screw is spherical in shape and is housed in a seat integral with the support plate, said seat and said distal end being configured so as to form a linear/annular connection.

8. The telescope according to claim 6, wherein each adjusting screw acts in a separate contact area, which areas form with the center of the ball-joint, an angle of 90°.

9. The telescope according to claim 8, wherein:
one or more elastic members act on the support plate,
each elastic member acts in a contact area, which is separate from the contact areas of the adjusting screws.

10. The telescope according to claim 1, wherein the adjustment button and/or the housing part are provided with graduations.

11. The telescope according to 2, wherein:
the screw and the nut of the screw/nut mechanism are coaxial to the optical axis of the telescope,
the adjustment button is rotatably mounted mobile about an axis which is coaxial to the optical axis of the telescope.

12. The telescope according to claim 2, wherein the hinge of the support plate on the carriage is a ball-joint centered on the axis of the mirror.

13. The telescope according to claim 3, wherein the hinge of the support plate on the carriage is a ball-joint centered on the axis of the mirror.

* * * * *